United States Patent
Banville et al.

(10) Patent No.: US 12,448,904 B1
(45) Date of Patent: Oct. 21, 2025

(54) SEAL ASSEMBLY MATING PLATE FOR AIRCRAFT POWERPLANT

(71) Applicant: Pratt & Whitney Canada Corp., Longueuil (CA)

(72) Inventors: Rose-Elizabeth Banville, Longueuil (CA); Hugo Quintin, Varennes (CA); Michel Labbe, Montreal (CA); Simon Cartier, St-Bruno-de-Montarville (CA); Cedric Chan Chuen, Laval (CA); Sebastien Gagne, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/899,959

(22) Filed: Sep. 27, 2024

(51) Int. Cl.
F01D 25/18 (2006.01)

(52) U.S. Cl.
CPC ...... F01D 25/183 (2013.01); *F05D 2220/323* (2013.01); *F05D 2240/55* (2013.01)

(58) Field of Classification Search
CPC .... F01D 25/183; F16C 33/72; F16C 33/7843; F16C 33/7859; F04D 29/10; F04D 29/12
See application file for complete search history.

(56) References Cited

U.S. PATENT DOCUMENTS

| | | | |
|---|---|---|---|
| 7,175,388 B2 * | 2/2007 | Labbe | F01D 11/02 415/230 |
| 8,777,229 B2 | 7/2014 | Davis | |
| 10,914,382 B2 | 2/2021 | Komatsu | |
| 11,015,715 B2 | 5/2021 | Miller | |
| 11,486,447 B2 | 11/2022 | Maskaliunas | |
| 11,608,751 B2 * | 3/2023 | Polly | F02C 7/28 |
| 2022/0056808 A1 | 2/2022 | Sandoval | |
| 2023/0003141 A1 | 1/2023 | Earnshaw | |

* cited by examiner

Primary Examiner — Danielle M. Christensen
(74) Attorney, Agent, or Firm — Getz Balich LLC (57) ABSTRACT

An assembly includes a rotating seal land, a seal element, a stationary seal support and a mating plate. The seal element axially overlaps, circumscribes and radially sealingly engages the rotating seal land. The stationary seal support axially overlaps and circumscribes the rotating seal land and the seal element. The stationary seal support includes a support notch, a support shoulder, a support inner interior surface and a support outer interior surface. The support notch projects axially into the stationary seal support from a distal end of the stationary seal support to the support shoulder. The support notch projects radially outward away from an axis into the stationary seal support from the support inner interior surface to the support outer interior surface. The mating plate is seated in the support notch and mounted to the stationary seal support. The mating plate axially contacts the support shoulder and the seal element.

18 Claims, 4 Drawing Sheets

SEAL ASSEMBLY MATING PLATE FOR AIRCRAFT POWERPLANT

TECHNICAL FIELD

This disclosure relates generally to a seal assembly and, more particularly, to a mating plate for the seal assembly.

BACKGROUND INFORMATION

An aircraft powerplant such as a gas turbine engine may include a seal assembly with one or more carbon seal elements. Various types and configurations of such seal assemblies are known in the art. While these known seal assemblies have various benefits, there is still room in the art for improvement.

SUMMARY

According to an aspect of the present disclosure, an assembly is provided for an aircraft powerplant. This assembly includes a rotating seal land, a seal element, a stationary seal support and a mating plate. The rotating seal land extends axially along an axis. The seal element axially overlaps, circumscribes and radially sealingly engages the rotating seal land. The stationary seal support axially overlaps and circumscribes the rotating seal land and the seal element. The stationary seal support includes a support notch, a support shoulder, a support inner interior surface and a support outer interior surface. The support notch projects axially into the stationary seal support from a distal end of the stationary seal support to the support shoulder. The support notch projects radially outward away from the axis into the stationary seal support from the support inner interior surface to the support outer interior surface. The mating plate is seated in the support notch and mounted to the stationary seal support. The mating plate axially contacts the support shoulder and the seal element. The mating plate is configured with an asymmetric geometry along the axis.

According to another aspect of the present disclosure, another assembly is provided for an aircraft powerplant. This assembly includes a first seal element, a second seal element, a biasing device, a stationary seal support and a mating plate. The first seal element extends circumferentially around an axis. The second seal element extends circumferentially around the axis. The biasing device is compressed axially between the first seal element and the second seal element. The stationary seal support includes a support base and a support flange. The support base axially overlaps and circumscribes the first seal element, the second seal element and the biasing device. The support flange projects radially inwards towards the axis from the support base. The support flange is abutted axially against the second seal element. The mating plate is mounted to the support base. The mating plate extends axially between a first end of the mating plate and a second end of the mating plate wherein the second end of the mating plate is axially abutted against the first seal element, and the mating plate configured such that: when the second end of the mating plate is axially facing the first seal element, the mating plate is operable to be mounted to the support base; and when the first end of the mating plate is axially facing the first seal element, the mating plate is inoperable to be mounted to the support base.

According to still another aspect of the present disclosure, an assembly method is provided that includes: arranging a carbon seal element within a bore of a stationary support structure and with a rotating seal land, the carbon seal element extending axially along and circumferentially around an axis, and the carbon seal element radially sealingly engaging the rotating seal land to form a radial seal interface between the carbon seal element and the rotating seal land; and mounting a mating plate with the stationary support structure within the bore, the mating plate axially abutted against a shoulder of the stationary support structure, the mating plate extending axially between a first end of the mating plate and a second end of the mating plate, and the second end of the mating plate axially contacting the carbon seal element to form an axial seal interface between the carbon seal element and the mating plate. The mating plate is inoperable to be mounted with the stationary support structure and axially contact with carbon seal element when the second end of the mating plate axially faces the carbon seal element.

The mating plate may have an asymmetric geometry along the axis.

The asymmetric geometry may facilitate a one-way installation of the mating plate with the stationary seal support.

The mating plate may extend axially along the axis from a first end of the mating plate to a second end of the mating plate. A surface finish of a first surface of the mating plate at the first end of the mating plate may be rougher than a surface finish of a second surface of the mating plate at the second end of the mating plate. The seal element may axially contact the second surface of the mating plate.

The mating plate may include a plate first surface, a plate second surface and a plate inner surface. The mating plate may extend axially from the plate first surface to the plate second surface wherein the seal element axially contacts the plate second surface. The mating plate may extend radially inward towards the axis to the plate inner surface. A corner between the plate first surface and the plate inner surface may be chamfered.

A corner between the plate second surface and the plate inner surface may be non-chamfered.

The mating plate may extend radially from an inner side of the mating plate to an outer side of the mating plate wherein the stationary seal support is radially next to the outer side of the mating plate. The mating plate may extend axially from a first end of the mating plate to a second end of the mating plate wherein the seal element axially contacts the second end of the mating plate. An outer plate notch may project radially inward towards the axis into the mating plate from the outer side of the mating plate. The outer plate notch may project axially into the mating plate from the second end of the mating plate.

An inner plate notch may project radially outward away from the axis into the mating plate from the inner side of the mating plate. The inner plate notch may project axially into the mating plate from the first end of the mating plate.

A groove may project radially outward away from the axis into the mating plate from the inner plate notch. The groove may extend axially within the mating plate.

The mating plate may extend radially from an inner side of the mating plate to an outer side of the mating plate wherein the stationary seal support is radially next to the outer side of the mating plate. The mating plate may extend axially from a first end of the mating plate to a second end of the mating plate wherein the seal element axially contacts the second end of the mating plate. An inner plate notch may project radially into the mating plate from the inner side of the mating plate. The inner plate notch may project axially into the mating plate from the first end of the mating plate.

A groove may project radially outward away from the axis into the mating plate from the inner plate notch. The groove may extend axially within the mating plate.

A threaded aperture may project axially into the mating plate in an axial direction towards the seal element.

The mating plate may include: a base seated in the support notch and mounted to the stationary seal support wherein the seal element axially contacts the base; and an arm projecting axially out from the base in an axial direction away from the seal element, the arm located at a radial inner side of the mating plate.

The assembly may also include a retaining ring capturing the mating plate axially between the retaining ring and the support shoulder.

The mating plate may radially engage the stationary seal support at a radial interference fit between the mating plate and the stationary seal support.

The assembly may also include a seal ring radially between and engaged with the mating plate and the stationary seal support.

The assembly may also include a seal assembly radially between the stationary seal support and the rotating seal land. The seal assembly may include the seal element, the mating plate and a second seal element. The second seal element may axially overlap, circumscribe and radially sealingly engage the rotating seal land.

The aircraft powerplant may be configured as or otherwise include a gas turbine engine. The assembly may also include: a rotating structure of the gas turbine engine, the rotating structure including the rotating seal land; and a housing of the gas turbine engine, the stationary seal support attached to the housing.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
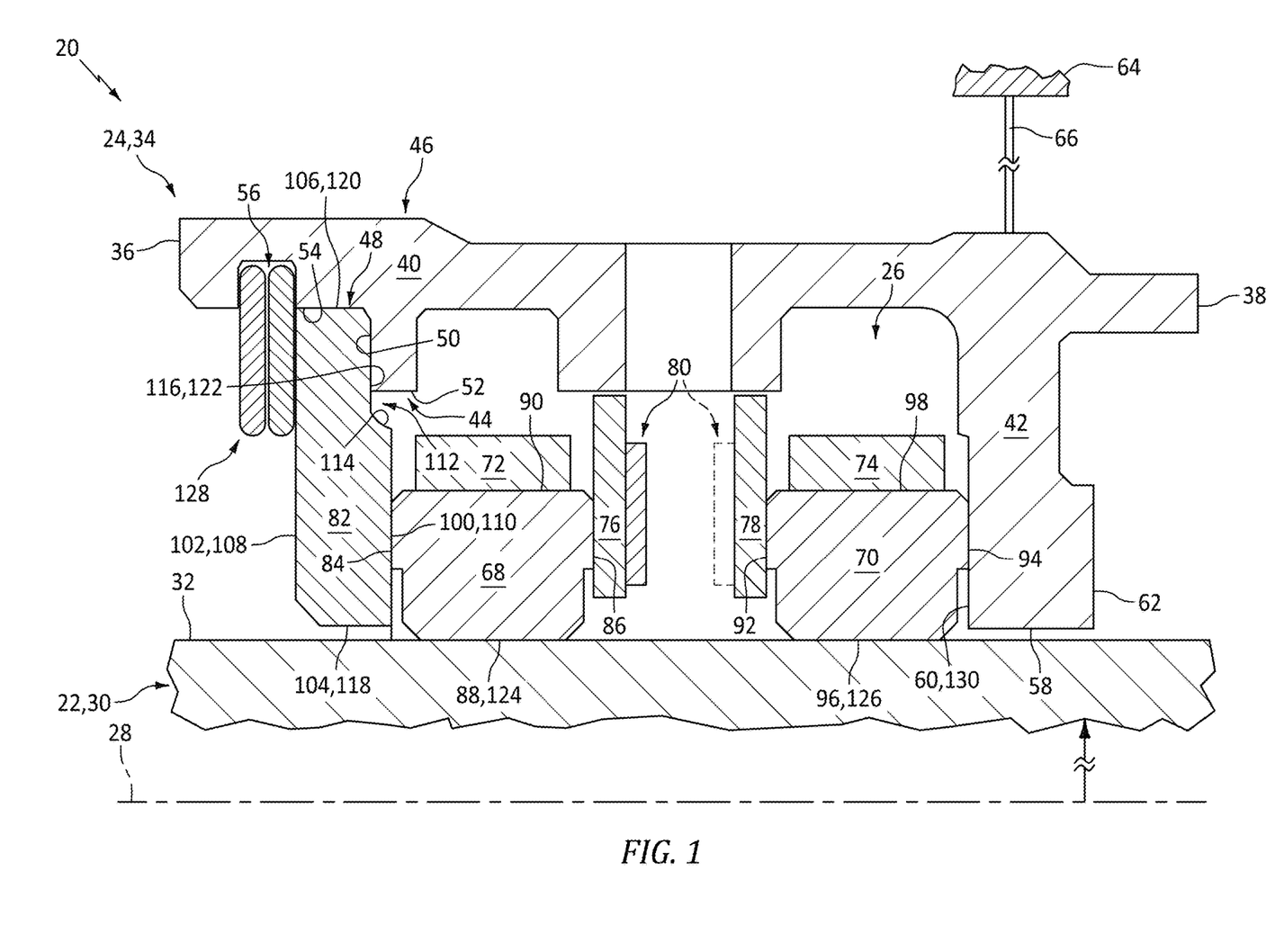
FIG. 1 is a partial sectional illustration of an aircraft powerplant assembly with a seal assembly.

FIG. 1 illustrates an assembly 20 of a powerplant for an aircraft. The aircraft may be an airplane, a helicopter, a drone (e.g., an unmanned aerial vehicle (UAV)) or any other manned or unmanned aerial vehicle or system. The aircraft powerplant may be configured as, or otherwise included as part of, a propulsion system for the aircraft. The aircraft powerplant, for example, may be a turbofan engine, a turbojet engine, a turboprop engine, a turboshaft engine, or any other type of internal combustion engine configured to generate thrust and/or drive operation of an air mover; e.g., a ducted or open propulsor rotor. The aircraft powerplant may alternatively (or also) be configured as, or otherwise included as part of, a power generation system for the aircraft. The aircraft powerplant, for example, may be an auxiliary power unit (APU) or any other type of internal combustion engine configured to mechanically power operation of an electrical generator. The present disclosure, however, is not limited to such exemplary aircraft powerplants. The aircraft powerplant, for example, may alternatively be configured as or otherwise include a hybrid-electric powerplant, an electric motor, or another power unit with a sealed interface between rotating and stationary components as described herein. However, for ease of description, the aircraft powerplant may be described below as a gas turbine engine.

The powerplant assembly 20 of FIG. 1 includes a rotating structure 22, a stationary structure 24 and a seal assembly 26 between the rotating structure 22 and the stationary structure 24. The powerplant assembly 20 extends axially along an axis 28. This axis 28 may be a centerline axis of the rotating structure 22, the stationary structure 24, the seal assembly 26 and/or, more generally, the powerplant assembly 20. The axis 28 may also or alternatively be a rotational axis of the rotating structure 22.

The rotating structure 22 may be configured as or otherwise includes a rotating seal land 30. This rotating seal land 30 extends axially along and circumferentially around the axis 28. The rotating seal land 30 projects radially outward (e.g., in a radial direction away from the axis 28) to a seal land surface 32 at a radial outer side of the rotating seal land 30. The seal land surface 32 faces radially outward towards the stationary structure 24 and the seal assembly 26, and has a regular cylindrical geometry. The rotating seal land 30 may be an integral part of another aircraft powerplant rotor such as, for example, an aircraft powerplant shaft; e.g., an engine shaft. Alternatively, the rotating seal land 30 may be configured as a discrete body (e.g., a sleeve, a runner, etc.) mounted onto or otherwise attached to the aircraft powerplant rotor.

The stationary structure 24 may be configured as or otherwise includes a stationary seal support 34; e.g., a carrier and/or a mount for the seal assembly 26. This stationary seal support 34 extends axially along the axis 28 from an axial first distal end 36 of the stationary seal support 34 to an axial second distal end 38 of the stationary seal support 34. The stationary seal support 34 of FIG. 1 includes a seal support base 40 and a seal support flange 42. The stationary seal support 34 and its seal support members 40 and 42 extend circumferentially about (e.g., completely around) the axis 28, providing the stationary seal support 34 of FIG. 1 and its seal support members 40 and 42 each with full-hoop (e.g., tubular or annular) geometries.

The support base 40 extends axially along the axis 28 from the support first distal end 36 to the support second distal end 38. The support base 40 extends radially from a radial interior side 44 of the support base 40 to a radial exterior side 46 of the stationary seal support 34 and its support base 40.

The support base 40 of FIG. 1 is configured with a seal support notch 48 at (e.g., on, adjacent or proximate) the support base interior side 44 and the support first distal end 36. This support notch 48 projects axially partially into the stationary seal support 34 and its support base 40 from the support first distal end 36 to a (e.g., annular) shoulder 50 of the stationary seal support 34 and its support base 40. The support shoulder 50 of FIG. 1 is planar and is perpendicular to the axis 28. The support notch 48 projects radially outward partially into the stationary seal support 34 and its support base 40 from (a) an inner interior surface 52 of the stationary seal support 34 and its support base 40 at the support base interior side 44 to (b) an outer interior surface 54 of the stationary seal support 34 and its support base 40. Each of the support interior surfaces 52, 54 of FIG. 1 has a regular cylindrical geometry and is parallel to the axis 28. The support outer interior surface 54 is recessed radially outward into the support base 40 from the support inner interior surface 52. The support notch 48 extends circumferentially within the stationary seal support 34 and its support base 40 circumferentially about (e.g., completely around) the axis 28.

The support base 40 may also be configured with a retainer groove 56 at the support base interior side 44. This retainer groove 56 extends axially within the stationary seal support 34 and its support base 40 between opposing axial sides of the retainer groove 56. The retainer groove 56 projects radially outward partially into the stationary seal support 34 and its support base 40 from the support outer interior surface 54 to a radial distal end of the retainer groove 56. The retainer groove 56 extends circumferentially within the stationary seal support 34 and its support base 40 circumferentially about (e.g., completely around) the axis 28.

The support flange 42 is connected to (e.g., formed integral with or otherwise attached to) the support base 40. The support flange 42 of FIG. 1 is located at or near the support second distal end 38. The support flange 42 projects radially inward (e.g., in a radial direction towards the axis 28) from the support base 40 to a radial inner distal end 58 of the support flange 42. The support flange 42 extends axially along the axis 28 and the support base 40 from an axial first end 60 of the support flange 42 to an axial second end 62 of the support flange 42.

The stationary seal support 34 is spaced radially outboard from the rotating structure 22 and its rotating seal land 30. The stationary seal support 34 extends axially along (e.g., axially overlaps) and extends circumferentially about (e.g., circumscribes) the rotating structure 22 and its rotating seal land 30. The stationary seal support 34 of FIG. 1 is attached to an aircraft powerplant housing 64 (e.g., an engine case) through a powerplant support structure 66 such as a frame, a bulkhead, or the like. The stationary seal support 34 may be configured as a discrete body mounted to and seated within a bore of the powerplant support structure 66. Alternatively, the stationary seal support 34 may be an integral part of the powerplant support structure 66 or, more generally, the aircraft powerplant housing 64.

The seal assembly 26 is configured to seal a gap between the rotating structure 22 and the stationary structure 24. The seal assembly 26 of FIG. 1 includes one or more stationary carbon seal elements 68 and 70, one or more stationary seal element bands 72 and 74, one or more stationary washers 76 and 78, a stationary biasing device 80 (e.g., a wave spring or other spring element) and a stationary mating plate 82 (e.g., a seal plate).

The first seal element 68 extends axially along the axis 28 from an axial first end 84 of the first seal element 68 to an axial second end 86 of the first seal element 68. The first seal element 68 extends radially from a radial inner side 88 of the first seal element 68 to a radial outer side 90 of the first seal element 68. The first seal element 68 extends circumferentially about (e.g., completely around) the axis 28. In some embodiments, the first seal element 68 may be configured as a substantially full-hoop and monolithic body. The first seal element 68, for example, may have a piston ring type geometry. In other embodiments, the first seal element 68 may be formed from a plurality of discrete arcuate seal element segments which are arranged circumferentially end-to-end about the axis 28 to provide the first seal element 68 with a segmented full-hoop geometry.

The second seal element 70 extends axially along the axis 28 from an axial first end 92 of the second seal element 70 to an axial second end 94 of the second seal element 70. The second seal element 70 extends radially from a radial inner side 96 of the second seal element 70 to a radial outer side 98 of the second seal element 70. The second seal element 70 extends circumferentially about (e.g., completely around) the axis 28. In some embodiments, the second seal element 70 may be configured as a substantially full-hoop and monolithic body. The second seal element 70, for example, may have a piston ring type geometry. In other embodiments, the second seal element 70 may be formed from a plurality of discrete arcuate seal element segments which are arranged circumferentially end-to-end about the axis 28 to provide the second seal element 70 with a segmented full-hoop geometry.

The mating plate 82 is configured with an asymmetric geometry along the axis 28 to facilitate one-way (e.g., mistake-proof) installation of the mating plate 82 with the stationary seal support 34. With such an arrangement, the mating plate 82 is not reversable along the axis 28 as described below in further detail. A single axial end 100 of the mating plate 82 may thereby be machined for engaging the first seal element 68 while an opposing axial end 102 of the mating plate 82 may be left with a rougher surface finish. This may reduce mating plate manufacturing costs and/or facilitate integration of one or more other features as described below in further detail.

The mating plate 82 extends axially along the axis 28 from the axial first end 102 of the mating plate 82 to the axial second end 100 of the mating plate 82. The mating plate 82 extends radially from a radial inner side 104 of the mating plate 82 to a radial outer side 106 of the mating plate 82. The mating plate 82 extends circumferentially about (e.g., completely around) the axis 28, providing the mating plate 82 of FIG. 1 with a full-hoop (e.g., annular) geometry.

The mating plate 82 has a first surface 108 at the plate first end 102. This plate first surface 108 may be planar and perpendicular to the axis 28. The plate first surface 108 has a first surface finish. The mating plate 82 also has a second surface 110 at the plate second end 100. This plate second surface 110 is planar and is perpendicular to the axis 28. The mating plate 82 is machined (e.g., ground) at its plate second end 100 to provide the plate second surface 110 with a second surface finish which is smoother than the first surface finish.

The mating plate 82 of FIG. 1 is configured with a radial outer plate notch 112 at the plate outer side 106 and the plate second end 100. This outer plate notch 112 projects partially radially inward into the mating plate 82 from the plate outer side 106 to a radial inner distal end 114 of the outer plate notch 112. The outer plate notch 112 projects partially axially into the mating plate 82 from the plate second end 100 and its plate second surface 110 to an axial side 116 of the outer plate notch 112. The outer plate notch 112 extends within the mating plate 82 circumferentially about (e.g., completely around) the axis 28.

A first inner corner of the mating plate 82 of FIG. 1 between the plate first surface 108 and a radial inner surface 118 of the mating plate 82 at the plate inner side 104 is chamfered. Such a chamfered first inner corner may facilitate installation of the mating plate 82 about the rotating structure 22 and its rotating seal land 30. By contrast, a second inner corner of the mating plate 82 of FIG. 1 between the plate second surface 110 and the plate inner surface 118 is non-chamfered; e.g., squared-off, pointed, sharp, etc. Here, the plate inner surface 118 has a regular cylindrical surface.

A first outer corner of the mating plate 82 of FIG. 1 between the plate first surface 108 and a radial outer surface 120 of the mating plate 82 at the plate outer side 106 is non-chamfered; e.g., squared-off, pointed, sharp, etc. By contrast, a second outer corner of the mating plate 82 of FIG. 1 between an axially recessed surface 122 of the mating plate 82 at the notch side 116 and the plate outer surface 120 is chamfered. Such a chamfered second outer corner may facilitate installation of the mating plate 82 with the stationary seal support 34. Here, the plate outer surface 120 has a regular cylindrical surface.

Following installation of the seal assembly 26, the first seal element 68 is arranged with the rotating structure 22 and its rotating seal land 30. The first seal element 68 of FIG. 1, for example, is disposed radially outboard of the rotating seal land 30. The first seal element 68 extends axially along (e.g., axially overlaps) and extends circumferentially about (e.g., circumscribes) the rotating seal land 30. A radial inner surface 124 of the first seal element 68 at its first element inner side 88 radially sealingly engages (e.g., through a slight fluid buffer cushion, directly at a local point contact during high vibrations and/or a transient regime, etc.) the seal land surface 32 to form a radial seal interface between the first seal element 68 and the rotating seal land 30. This radial sealing engagement may be maintained between the first seal element 68 and the rotating seal land 30 by radially containing the first seal element 68 within the first seal element band 72. The first seal element band 72 of FIG. 1, for example, circumscribes and radially contacts the first seal element 68 at its first element outer side 90. This first seal element band 72 may be configured with a similar thermal expansion coefficient or the same thermal expansion coefficient as the rotating seal land 30 such that the first seal element 68 and the rotating seal land 30 may thermally expand and/or contract at a similar rate. Of course, it is contemplated other techniques may also or alternatively be utilized to maintain radial sealing engagement between the first seal element 68 and the rotating seal land 30.

The second seal element 70 is arranged with the rotating structure 22 and its rotating seal land 30. The second seal element 70 of FIG. 1, for example, is disposed radially outboard of the rotating seal land 30. The second seal element 70 extends axially along (e.g., axially overlaps) and extends circumferentially about (e.g., circumscribes) the rotating seal land 30. A radial inner surface 126 of the second seal element 70 at its second element inner side 96 radially sealingly engages (e.g., through a slight fluid buffer cushion, directly at a local point contact during high vibrations and/or a transient regime, etc.) the seal land surface 32 to form a radial seal interface between the second seal element 70 and the rotating seal land 30. This radial sealing engagement may be maintained between the second seal element 70 and the rotating seal land 30 by radially containing the second seal element 70 within the second seal element band 74. The second seal element band 74 of FIG. 1, for example, circumscribes and radially contacts the second seal element 70 at its second element outer side 98. This second seal element band 74 may be configured with a similar thermal expansion coefficient or the same thermal expansion coefficient as the rotating seal land 30 such that the second seal element 70 and the rotating seal land 30 may thermally expand and/or contract at a similar rate. Of course, it is contemplated other techniques may also or alternatively be utilized to maintain radial sealing engagement between the second seal element 70 and the rotating seal land 30.

The second seal element 70 is biased axially away from the first seal element 68. The biasing device 80 of FIG. 1, for example, is arranged axially between and is compressed axially between the first seal element 68 and the second seal element 70. The first washer 76 is arranged axially between and axially contacts (a) the first seal element 68 at its first element second end 86 and (b) the biasing device 80 at its axial first side. The second washer 78 is arranged axially between and axially contacts (a) the second seal element 70 at its second element first end 92 and (b) the biasing device 80 at its axial second side.

The mating plate 82 is seated and press fit in the support notch 48 and mounted to the stationary seal support 34 and its support base 40. The plate recessed surface 122 of FIG. 1 axially contacts the support shoulder 50. The plate outer surface 120 radially contacts the support outer interior surface 54 and seals the seal assembly 26 through a tight fit condition. A retaining ring 128 is seated in the retainer groove 56 axially next to the mating plate 82 and its plate first end 102/its plate first surface 108. With this arrangement, the mating plate 82 is axially captured and retained between the retaining ring 128 and the support shoulder 50. The present disclosure, however, is not limited to such an exemplary mounting technique. It is contemplated, for example, the tight fit may be relocated from the plate outer side 106 to the radial inner distal end 114. In such embodiments, there may be a loose fit at the plate outer side 106.

The first seal element 68 is axially retained by the mating plate 82. The first element first end 84 of FIG. 1, for example, is axially abutted against and contacts the machined plate second surface 110. Similarly, the second seal element 70 is axially retained by the support flange 42. The second element second end 94 of FIG. 1, for example, is axially abutted against and contacts a machined surface 130 of the support flange 42 at its flange first end 60.

Figure 2:
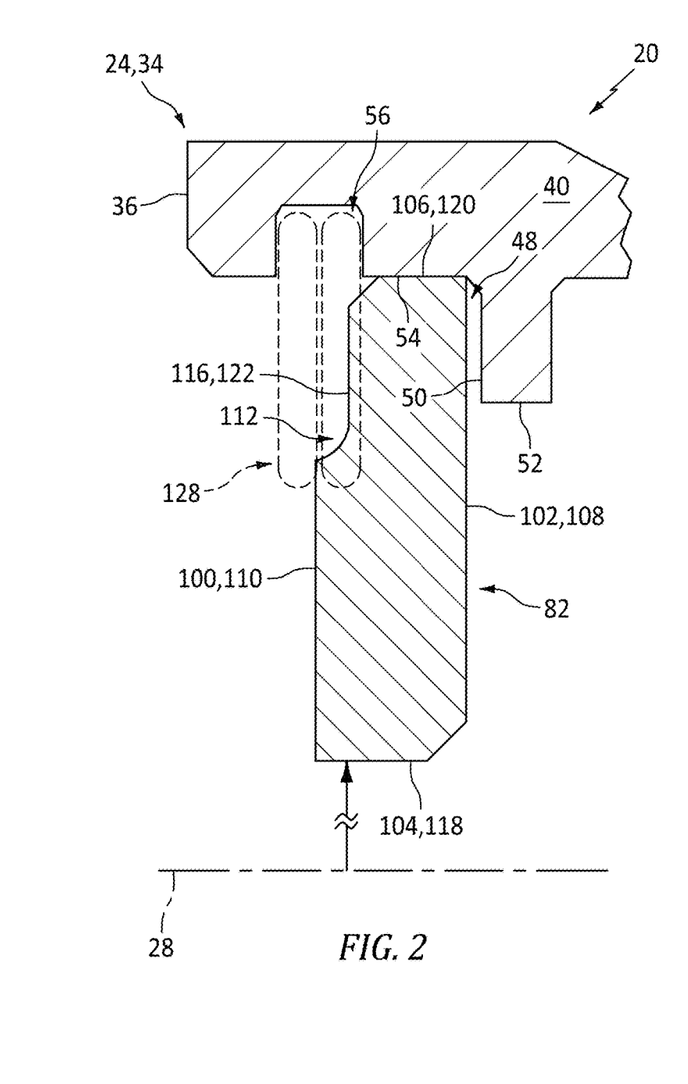
FIG. 2 is a partial sectional illustration of the seal assembly with its mating plate in an opposite orientation.

As indicated above, the mating plate 82 is configured to facilitate the one-way (e.g., mistake-proof) installation of the mating plate 82 with the stationary seal support 34. With the arrangement of FIG. 1, the one-way installation occurs when (a) the plate second end 100 and its plate second surface 110 face the first seal element 68 and (b) a portion of the support base 40 carrying the support shoulder 50 is seated in the outer plate notch 112. By contrast, if the orientation of the mating plate 82 was axially reversed as shown in FIG. 2, the mating plate 82 may axially overlap the retainer groove 56 and thereby prevent installation of the retaining ring 128. A technician may thereby readily recognize that the mating plate 82 cannot be properly mounted to the stationary seal support 34 and, thus, the mating plate 82 is improperly oriented.

Figure 3:
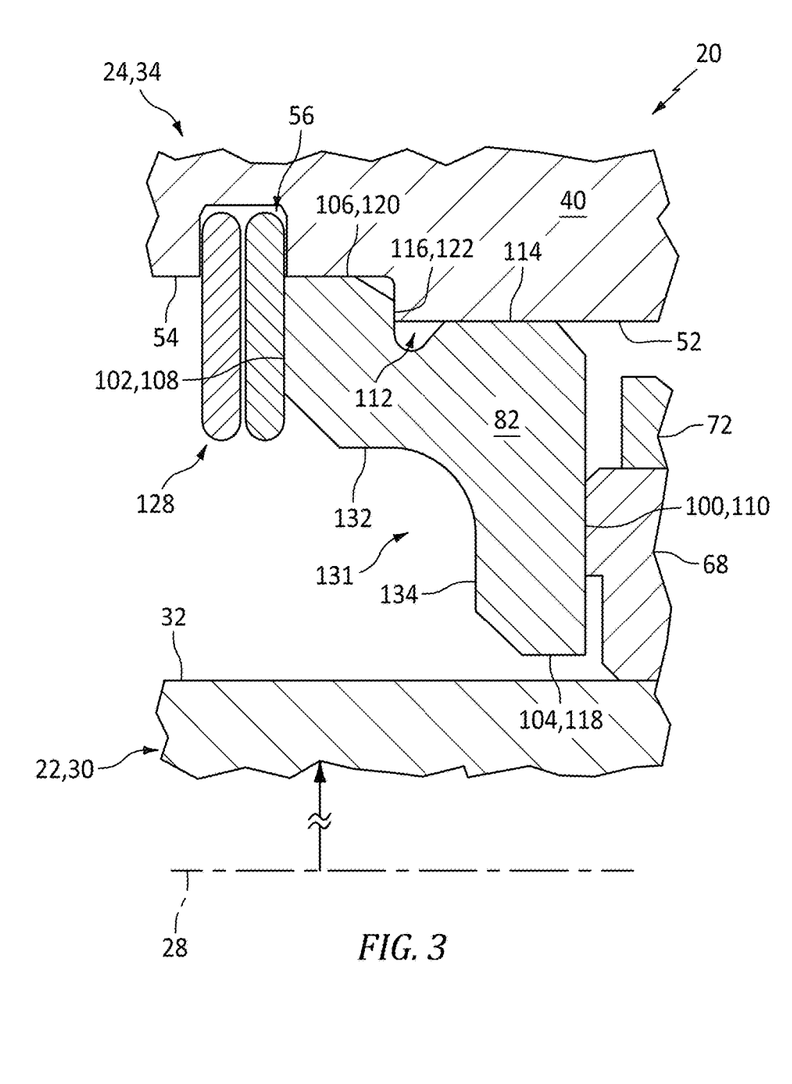
FIGS. 3-7 are partial sectional illustrations of the seal assembly with various alternative mating plate arrangements.

In some embodiments, referring to FIG. 3, the mating plate 82 may be configured with a radial inner plate notch 131 at the plate inner side 104 and the plate first end 102. This inner plate notch 131 projects partially radially outward into the mating plate 82 from the plate inner side 104 to a radial outer distal end 132 of the inner plate notch 131. The inner plate notch 131 projects partially axially into the mating plate 82 from the plate first end 102 and its plate first surface 108 to an axial side 134 of the inner plate notch 131. The inner plate notch 130 extends within the mating plate 82 circumferentially about (e.g., completely around) the axis 28.

Figure 4:
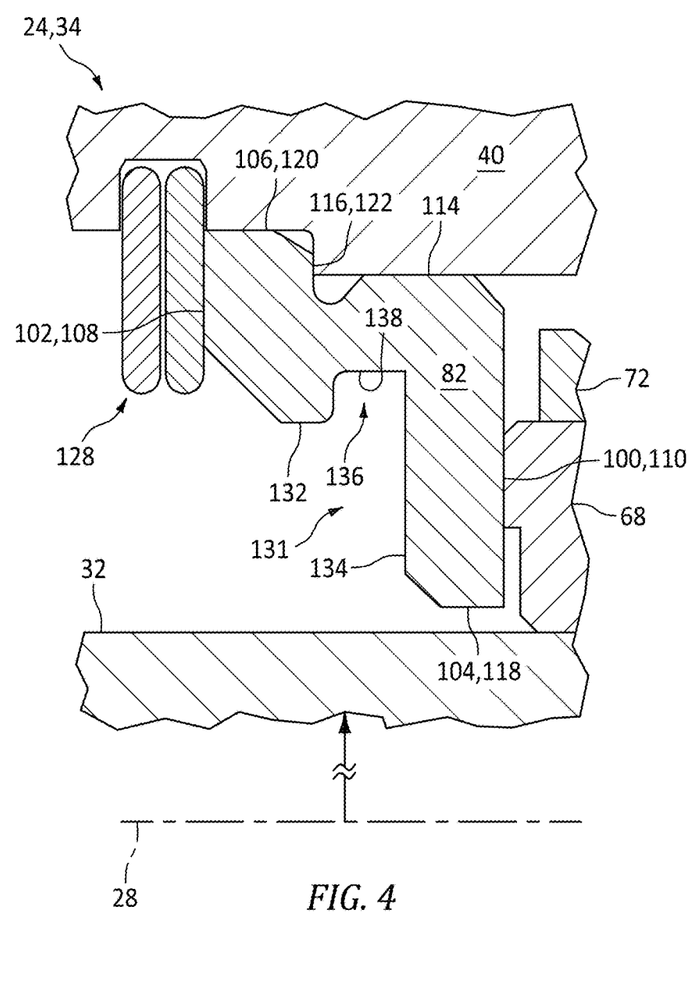

In some embodiments, referring to FIG. 4, the mating plate 82 may be configured with a puller groove 136. This puller groove 136 projects partially radially outward into the mating plate 82 from the inner plate notch 131 and the inner notch distal end 132 to a radial outer distal end 138 of the puller groove 136. The puller groove 136 extends axially within the mating plate 82 between axially opposing sides of the puller groove 136. The puller groove 136 extends within the mating plate 82 circumferentially about (e.g., completely around) the axis 28. With this arrangement, the puller groove 136 is configured to receive a tool during disassembly of the mating plate 82 from the stationary seal support 34 to facilitate pulling the mating plate 82 axially out of a bore of the stationary seal support 34 and its support base 40.

Figure 5:
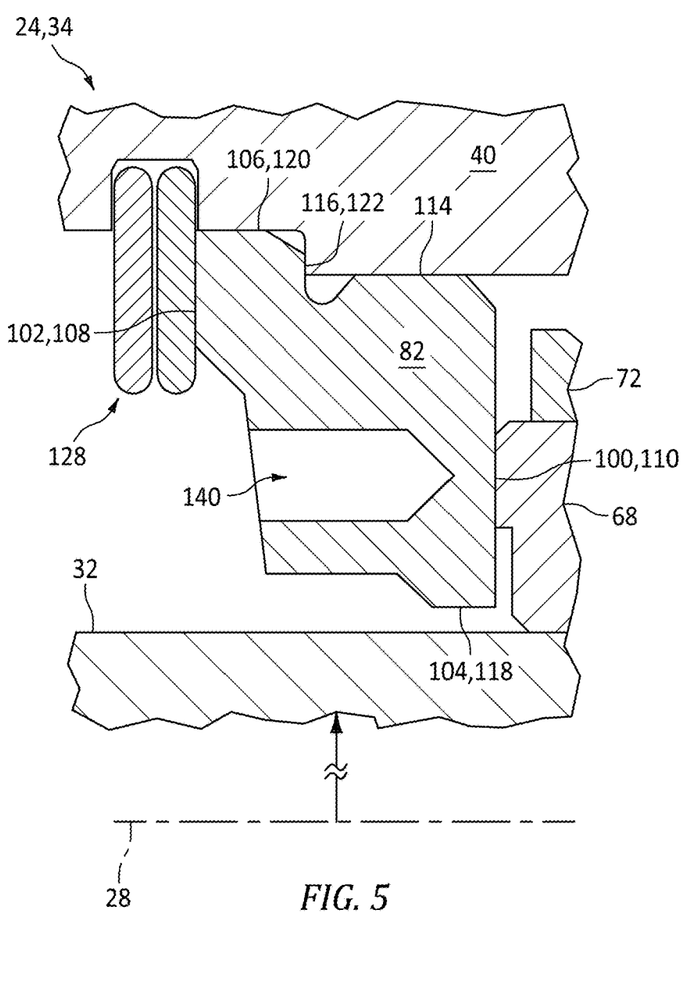

In some embodiments, referring to FIG. 5, the mating plate 82 may be configured with a threaded aperture 140. This threaded aperture 140 projects partially axially into the mating plate 82 from or near the plate first end 102 and its plate first surface 108 to an axial distal end of the threaded aperture 140. With this arrangement, the threaded aperture 140 is configured to receive a tool during disassembly of the mating plate 82 from the stationary seal support 34 to facilitate pulling the mating plate 82 axially out of the bore of the stationary seal support 34 and its support base 40.

Figure 6:
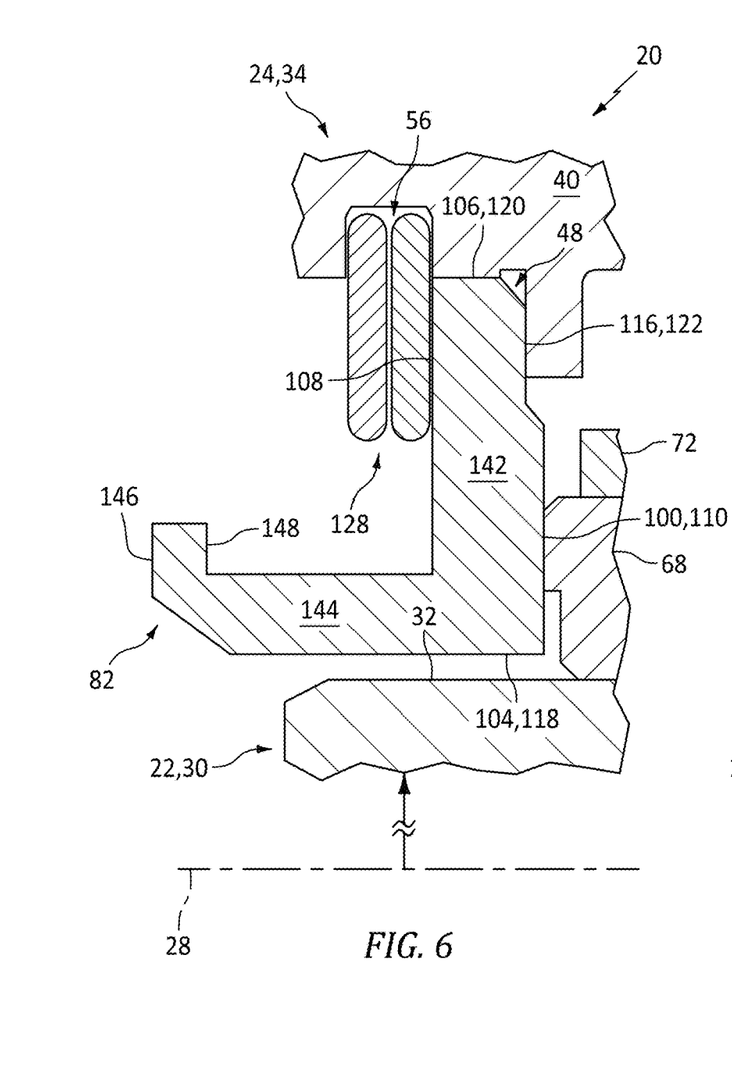

In some embodiments, referring to FIG. 6, the mating plate 82 may be configured with an annular plate base 142 and an annular plate arm 144. The plate base 142 of FIG. 6 carries the plate first surface 108 and the plate second surface 110. The plate base 142 is seated in the support notch 48 and is mounted to the stationary seal support 34 as described above. The plate arm 144 is connected to (e.g., formed integral with or otherwise attached to) the plate base 142 at the plate inner side 104. The plate arm 144 projects axially along the axis 28 out from the plate base 142 to an axial distal end 146 of the plate arm 144. At the arm distal end 146, the plate arm 144 may include a rim 148 that projects radially outward. This plate arm 144 may be used for disassembly of the mating plate 82 using a pulling tool. The plate arm 144 may also be used as a protector and/or a deflector for fluid (e.g., oil, water, etc.) ingestion into the seal assembly 26.

Figure 7:
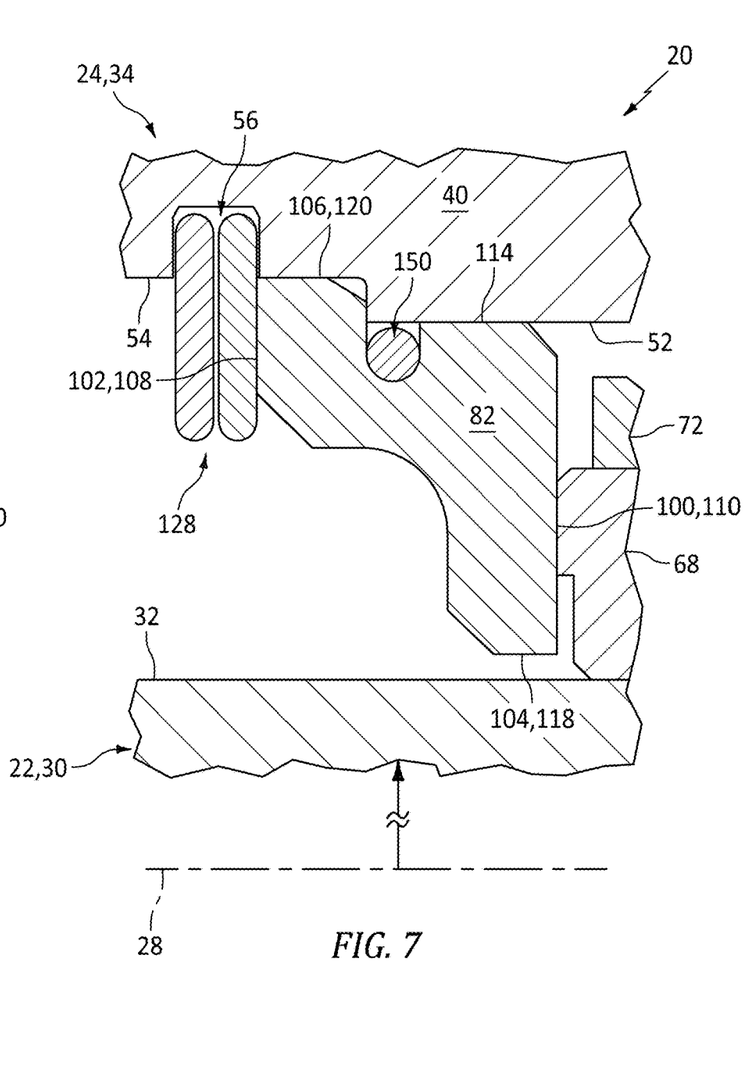

In some embodiments, referring to FIG. 7, a seal ring 150 may be arranged radially between and engaged with (e.g., contacting) the mating plate 82 and the stationary seal support 34. With such an arrangement, the seal ring 150 provides a seal interface between the mating plate 82 and the stationary seal support 34.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:
a rotating seal land extending axially along an axis;
a seal element axially overlapping, circumscribing and radially sealingly engaging the rotating seal land;
a stationary seal support axially overlapping and circumscribing the rotating seal land and the seal element, the stationary seal support including a support notch, a support shoulder, a support inner interior surface and a support outer interior surface, the support notch projecting axially into the stationary seal support from a distal end of the stationary seal support to the support shoulder, and the support notch projecting radially outward away from the axis into the stationary seal support from the support inner interior surface to the support outer interior surface; and
a mating plate seated in the support notch and mounted to the stationary seal support, the mating plate axially contacting the support shoulder and the seal element, and the mating plate configured with an asymmetric geometry along the axis;
wherein the mating plate extends axially along the axis from a first end of the mating plate to a second end of the mating plate;
wherein a surface finish of a first surface of the mating plate at the first end of the mating plate is rougher than a surface finish of a second surface of the mating plate at the second end of the mating plate; and
wherein the seal element axially contacts the second surface of the mating plate.

2. The assembly of claim 1, wherein the asymmetric geometry facilitates a one-way installation of the mating plate with the stationary seal support.

3. The assembly of claim 1, wherein
the mating plate further includes a plate inner surface;
the mating plate extends axially from the first surface to the second surface;
the mating plate extends radially inward towards the axis to the plate inner surface; and
a corner between the first surface and the plate inner surface is chamfered.

4. The assembly of claim 3, wherein a corner between the second surface and the plate inner surface is non-chamfered.

5. The assembly of claim 1, wherein
the mating plate extends radially from an inner side of the mating plate to an outer side of the mating plate wherein the stationary seal support is radially next to the outer side of the mating plate; and
an outer plate notch projects radially inward towards the axis into the mating plate from the outer side of the mating plate, and the outer plate notch projects axially into the mating plate from the second end of the mating plate.

6. The assembly of claim 5, wherein an inner plate notch projects radially outward away from the axis into the mating plate from the inner side of the mating plate, and the inner plate notch projects axially into the mating plate from the first end of the mating plate.

7. The assembly of claim 6, wherein a groove projects radially outward away from the axis into the mating plate from the inner plate notch, and the groove extends axially within the mating plate.

8. The assembly of claim 1, wherein
the mating plate extends radially from an inner side of the mating plate to an outer side of the mating plate wherein the stationary seal support is radially next to the outer side of the mating plate; and
an inner plate notch projects radially into the mating plate from the inner side of the mating plate, and the inner plate notch projects axially into the mating plate from the first end of the mating plate.

9. The assembly of claim 8, wherein a groove projects radially outward away from the axis into the mating plate from the inner plate notch, and the groove extends axially within the mating plate.

10. The assembly of claim 1, wherein a threaded aperture projects axially into the mating plate in an axial direction towards the seal element.

11. The assembly of claim 1, further comprising a retaining ring capturing the mating plate axially between the retaining ring and the support shoulder.

12. The assembly of claim 1, wherein the mating plate radially engages the stationary seal support at a radial interference fit between the mating plate and the stationary seal support.

13. The assembly of claim 1, further comprising:
a seal assembly radially between the stationary seal support and the rotating seal land;
the seal assembly including the seal element, the mating plate and a second seal element, and the second seal element axially overlapping, circumscribing and radially sealingly engaging the rotating seal land.

14. The assembly of claim 1, wherein the aircraft powerplant comprises a gas turbine engine, and the assembly further comprises:
a rotating structure of the gas turbine engine, the rotating structure comprising the rotating seal land; and
a housing of the gas turbine engine, the stationary seal support attached to the housing.

15. An assembly for an aircraft powerplant, comprising:
a rotating seal land extending axially along an axis;
a seal element axially overlapping, circumscribing and radially sealingly engaging the rotating seal land;
a stationary seal support axially overlapping and circumscribing the rotating seal land and the seal element, the stationary seal support including a support notch, a support shoulder, a support inner interior surface and a support outer interior surface, the support notch projecting axially into the stationary seal support from a distal end of the stationary seal support to the support shoulder, and the support notch projecting radially outward away from the axis into the stationary seal support from the support inner interior surface to the support outer interior surface; and
a mating plate seated in the support notch and mounted to the stationary seal support, the mating plate axially contacting the support shoulder and the seal element, and the mating plate configured with an asymmetric geometry along the axis, wherein the mating plate includes
a base seated in the support notch and mounted to the stationary seal support wherein the seal element axially contacts the base; and
an arm projecting axially out from the base in an axial direction away from the seal element, the arm located at a radial inner side of the mating plate.

16. An assembly for an aircraft powerplant, comprising:
a rotating seal land extending axially along an axis;
a seal element axially overlapping, circumscribing and radially sealingly engaging the rotating seal land;
a stationary seal support axially overlapping and circumscribing the rotating seal land and the seal element, the stationary seal support including a support notch, a support shoulder, a support inner interior surface and a support outer interior surface, the support notch projecting axially into the stationary seal support from a distal end of the stationary seal support to the support shoulder, and the support notch projecting radially outward away from the axis into the stationary seal support from the support inner interior surface to the support outer interior surface;
a mating plate seated in the support notch and mounted to the stationary seal support, the mating plate axially contacting the support shoulder and the seal element, and the mating plate configured with an asymmetric geometry along the axis; and
a seal ring radially between and engaged with the mating plate and the stationary seal support.

17. An assembly for an aircraft powerplant, comprising:
a first seal element extending circumferentially around an axis;
a second seal element extending circumferentially around the axis;
a biasing device compressed axially between the first seal element and the second seal element;
a stationary seal support including a support base and a support flange, the support base axially overlapping and circumscribing the first seal element, the second seal element and the biasing device, the support flange projecting radially inwards towards the axis from the support base, and the support flange abutted axially against the second seal element; and
a mating plate mounted to the support base, the mating plate extending axially between a first end of the mating plate and a second end of the mating plate wherein the second end of the mating plate is axially abutted against the first seal element, and the mating plate configured such that
when the second end of the mating plate is axially facing the first seal element, the mating plate is operable to be mounted to the support base; and
when the first end of the mating plate is axially facing the first seal element, the mating plate is inoperable to be mounted to the support base.

18. The assembly of claim 17, wherein the mating plate has an asymmetric geometry along the axis.

* * * * *